United States Patent Office 2,704,724
Patented Mar. 22, 1955

2,704,724

DEODORIZING PHENOLS

Joseph A. Chenicek, Bensenville, Ill., assignor to Universal Oil Products Company, Chicago, Ill., a corporation of Delaware No Drawing. Application December 23, 1949,
Serial No. 134,873

8 Claims. (Cl. 99—163)

This invention relates to a novel method of deodorizing phenols and more particularly 2-tert-alkyl-4-alkoxyphenols which are utilized as antioxidants in food products.

Various food products and particularly edible fats and oils undergo oxidative deterioration with the resultant development of rancidity. To prevent this rancidity development, a novel antioxidant has recently been marketed. This antioxidant comprises 2-tert-butyl-4-methoxyphenol and is very effective in preventing rancidity develoment.

In addition to being very effective in preventing rancidity development, an antioxidant for use in edible materials must be nontoxic and should be readily soluble in edible materials. In addition, the antioxidant preferably has the property of withstanding high temperatures so that it will carry over into the baked products.

The 2-tert-butyl-4-methoxyphenol antioxidant is particularly desirable for use in edible materials because it meets the specific requirements hereinbefore set forth. However, the antioxidant has a slight odor which may prove objectionable to a consumer with a keen olfactory sense, and the present invention is directed to a novel method of deodorizing the antioxidant.

In one embodiment the present invention relates to a method of deodorizing a phenol which comprises adding thereto from about 0.015% to about 0.04% by weight of vanillin.

In a specific embodiment the present invention relates to a method of deodorizing 2-tert-butyl-4-methoxyphenol which comprises adding thereto from about 0.015% to about 0.04% by weight of vanillin.

The use of vanillin for the purpose of deodorizing phenols offers an unexpected advantage. When used in the amounts as herein set forth, the vanillin masks or neutralizes the phenolic odor of the antioxidant but does not replace this odor with the odor of vanillin. This is an unexpected result because one would normally expect that the use of vanillin in low amounts would not serve to eliminate the phenolic odor of the antioxidant or, when used in large amounts, would result in a vanillin odor. As hereinbefore set forth, when the vanillin is used in amounts as herein specified, the product has substantially no odor.

In addition to this advantage, vanillin is particularly suitable for use in edible materials because it meets the requirements as hereinbefore set forth for the antioxidant. Thus, vanillin is non-toxic and, therefore, may be used in edible materials. Further, vanillin is readily soluble in the antioxidant and, therefore, may be readily commingled therewith.

As hereinbefore set forth, it is an important feature of the present invention that the vanillin be utilized in an amount of from about 0.015% to about 0.04% by weight of the antioxidant. It has been found that an amount of vanillin below 0.015% by weight does not serve to effectively mask the phenolic odor of the alkoxyphenol. On the other hand, an amount of vanillin above about 0.04% by weight results in a vanillin odor and, therefore, is objectionable.

The vanillin for use in accordance with the present invention may comprise synthetic vanillin as prepared by any well known method or it may comprise the vanilla bean extract. Vanillin also occurs in sugar beet, balsam and resins and these and other sources of vanillin may also be used in accordance with the present invention.

The vanillin is preferably added to the alkoxyphenol prior to the use of the latter in edible materials. However, it is understood that, when desired, the vanillin may be added along with the antioxidant to the edible material. The antioxidant is generally utilized in amounts of less than 1% by weight and preferably in an amount of from about 0.001% to about 0.2% by weight of the edible material.

While the preferred alkoxyphenol antioxidant comprises 2-tert-butyl-4-methoxyphenol, it is understood that the novel features of the present invention may be utilized with other phenols including alkyl-alkoxyphenols such as 2-tert-butyl-4-ethoxyphenol, 2-tert-butyl-4-propoxyphenol, 2-tert-butyl-4-butoxyphenol, 2-tert-amyl-4-methoxyphenol, 2-tert-amyl-4-ethoxyphenol, 2-tert-amyl-4-propoxyphenol, 2-tert-hexyl-4-methoxyphenol, 2-tert-hexyl-4-ethoxyphenol, 2-tert-heptyl-4-methoxyphenol, 2-tert-heptyl-4-ethoxyphenol, 2-tert-octyl-4-methoxyphenol, 2-tert-octyl-4-ethoxyphenol, etc. or mixtures thereof.

It is understood that the vanillin may be used along with other additives which are utilized in the alkoxyphenol antioxidant or in the edible material. For example, certain acids, such as ascorbic acid, phosphoric acid, citric acid etc. may be added to the antioxidant or edible material to obtain a synergistic effect with the antioxidant.

The following examples are introduced to illustrate further the novelty and utility of the present invention but not with the intention of unduly limiting the same.

*Example I*

The antioxidant used in this example comprised 2-tert-butyl-4-methoxyphenol. This antioxidant had a slight phenolic odor. Upon the addition of 0.025% by weight of vanillin, the product had no detectable odor.

*Example II*

When 0.01% by weight of vanillin was added to another sample of the antioxidant of Example I, the vanillin appeared to have no effect and the product still retained substantially the same phenolic odor.

*Example III*

When 0.05% by weight of vanillin was added to still another sample of the antioxidant of Example I, the product had a definite odor of vanillin.

I claim as my invention:

1. A method of neutralizing the odor of a 2-tert-alkyl-4-alkoxyphenol which comprises adding thereto from about 0.015% to about 0.04% by weight of vanillin.

2. A method of neutralizing the odor of 2-tert-butyl-4-methoxyphenol which comprises adding thereto from about 0.015% to about 0.04% by weight of vanillin.

3. A method of masking the phenolic odor of a 2-tert-alkyl-4-alkoxyphenol contained in an edible material which comprises adding thereto from about 0.015% to about 0.04% by weight of vanillin based on said alkoxyphenol.

4. 2-tert-butyl-4-methoxyphenol containing from about 0.015% to about 0.04% by weight of vanillin.

5. An edible material containing an alkoxyphenol and additionally containing from about 0.015% to about 0.04% by weight of vanillin based on said alkoxyphenol.

6. Edible fats and oils containing from about 0.0001% to about 0.02% by weight of 2-tert-butyl-4-methoxyphenol and additionally containing from about 0.015% to about 0.04% by weight of vanillin based on said 2-tert-butyl-4-methoxyphenol.

7. A 2-tert-alkyl-4-alkoxyphenol containing from about 0.015% to about 0.04% by weight of vanillin.

8. An alkyl-alkoxyphenol containing from about 0.015% to about 0.04% by weight of vanillin.

References Cited in the file of this patent

UNITED STATES PATENTS 2,064,610   Hunt _____ Dec. 15, 1936

OTHER REFERENCES

Moncrieff: The Chemical Senses, Leonard Hill Ltd., London, 1944, pages 84 and 85.